United States Patent
Moyer (10) Patent No.: US 11,016,849 B2
(45) Date of Patent: May 25, 2021

(54) KERNEL SOFTWARE RAID SUPPORT FOR DIRECT-ACCESS FILE SYSTEMS

(71) Applicant: Red Hat, Inc., Raleigh, NC (US)

(72) Inventor: Jeffrey E. Moyer, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 70 days.

(21) Appl. No.: 16/560,821

(22) Filed: Sep. 4, 2019

(65) Prior Publication Data
US 2021/0064469 A1 Mar. 4, 2021

(51) Int. Cl.
G06F 11/07 (2006.01)
G06F 11/10 (2006.01)

(52) U.S. Cl.
CPC .............. *G06F 11/1076* (2013.01)

(58) Field of Classification Search
CPC .......... G06F 11/1471; G06F 11/1415; G06F 11/1402
USPC ..................................................... 714/15, 16
See application file for complete search history.

(56) References Cited

U.S. PATENT DOCUMENTS

| 7,613,698 B2 | 11/2009 | Verma et al. | |
| 9,003,106 B1* | 4/2015 | Clark | G06F 12/0246 |
| | | | 711/103 |
| 2003/0084252 A1* | 5/2003 | Talagala | G06F 12/0866 |
| | | | 711/135 |
| 2015/0019906 A1* | 1/2015 | Gulati | G06F 11/1415 |
| | | | 714/6.22 |
| 2019/0065383 A1 | 2/2019 | Loaiza et al. | |
| 2019/0179750 A1* | 6/2019 | Moyer | G06F 11/2069 |

FOREIGN PATENT DOCUMENTS

| EP | 1849056 B9 | 11/2011 |
| JP | 5249188 B2 | 7/2013 |

OTHER PUBLICATIONS

Feilner et al., "NVDIMM and the Linux Kernel", Linux New Media USA, LLC, 2019, located at http://www.admin-magazine.com/HPC/Articles/NVDIMM-Persistent-Memory, 6 pages.
Zhang et al. "Pangolin: A Fault-Tolerant Persistent Memory Programming Library", University of California, San Diego, Apr. 22, 2019, located at https://arxiv.org/pdf/1904.10083.pdf, 14 pages.
Xu "Revolutionizing Storage Stack for Persistent Memories with NOVA File System", University of California, San Diego, 2018, located at https://cloudfront.escholarship.org/dist/prd/content/qt6ff3h9cq/qt6ff3h9cq.pdf, 136 pages.

* cited by examiner

*Primary Examiner* — Chae M Ko
(74) *Attorney, Agent, or Firm* — Womble Bond Dickinson (US) LLP (57) ABSTRACT

A method comprises detecting a write fault associated with a first page of a first plurality of pages of a first persistent memory and resolving the write fault. The method further comprises writing, in response to resolving the write fault, data to the first page. The method further comprises context switching, by a processing device, into a kernel associated with the persistent memory to provide a write confirmation to a client device requesting the data be written. The method further comprises updating, in response to the context switching, a parity block associated with the first page. The method further comprises providing, in response to updating the parity block, the write confirmation to the client device.

20 Claims, 6 Drawing Sheets

KERNEL SOFTWARE RAID SUPPORT FOR DIRECT-ACCESS FILE SYSTEMS

TECHNICAL FIELD

Aspects of the present disclosure relate to storing data in computing devices.

BACKGROUND

Computer systems generally employ a processor connected to a memory for fast access to data currently in use and a secondary storage device for the long term storage of data. Typically, memory storage may be provided by dynamic random access memory ("DRAM") modules, where data stored in such memory is erased when the computer system is powered down, as the data is stored in the charge state of the memory. Typically, long-term storage is non-volatile, such that data is stored even without power to the system. In typical examples, long-term storage may be provided by non-volatile storage, such as mechanical hard disk drives ("HDDs"), or non-volatile memory, such as electronically erasable programmable read-only memory ("EEPROM"). In a typical system, the processor may interface and address memory directly, but may access secondary storage through a host bus adapter over a peripheral interconnect. Accessing secondary storage is typically orders of magnitude slower than accessing memory such as DRAM. Data is often transferred to memory from the secondary storage before being acted on directly by a processor. For additional data security and fault tolerance, data in secondary storage may be mirrored or cloned to other storage devices as a backup measure.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Aspects of the present disclosure relate to storing data in computing devices. In typical computer system architectures, one or more processors (e.g., central processing units ("CPUs") or graphics processing units ("GPUs")) may be connected to memory devices (e.g., DRAM) and secondary storage devices (e.g., hard disk drives ("HDDs"), solid state drives ("SSDs"), EEPROM). In an example, a CPU may directly address memory, while secondary storage may be accessed via a host bus adapter over a peripheral interconnect. Typically, memory may be organized for data storage in page form, data being accessed directly by the processor, while secondary storage may be organized in storage blocks accessed via block commands. In an example, data may be moved between a memory device and a secondary storage device using direct memory access without necessarily requiring involvement by the CPU. In a typical example, because secondary storage is typically significantly slower than memory, and due to the block oriented storage structure of such secondary storage, caching layers are used in both the CPU and an operating system (e.g. Red Hat Enterprise Linux®) executing on the CPU to speed up access to data in the secondary storage.

In a typical example, an operating system cache, sometimes known as a page cache, tracks data storage on a per-file (or per-inode) basis. In an example, an application executing on the CPU may open a file and map portions of the file into the application's address space. However, the application would not typically map the file data directly from secondary storage, instead, space may be allocated in the page cache, and the page cache pages may in turn be mapped into the application's address space. Rather than transferring data preemptively out of secondary storage, such data transfer may typically be performed on demand, such that when, for example, the application attempts to access a mapped page before data is transferred from the secondary storage, a read fault is generated on the mapped page, resulting in a trap into the kernel that in turn results in the file system arranging for block input/output ("I/O") transfers from the secondary storage to the page cache pages.

Many storage device implementations, especially in enterprise environments, are typically part of systems that include replication of data to prevent against data loss due to a failure in any one physical storage device. This replication may be implemented through a redundant array of independent disks ("RAID") setup, where multiple independent storage devices are combined into a single logical device. RAID arrays may be designed to increase performance, to provide live data backup, or a combination of both. For example, storage throughput may be increased by simultaneously executing two storage operations on two separate disks in a RAID array, storing two files in the time it takes one disk to store one file (e.g., RAID 0). Similarly, two copies of the same file may be stored on two different disks resulting in automated backup and replication (e.g., RAID 1). RAID 1 is typically also known as data mirroring, and is a common configuration for delivering high performance, highly data redundant storage. In a RAID array designed for data security through replication, each piece of data on a given storage device may be saved in duplicate across at least two physical devices so that if one device fails, the data on that device may be reconstructed from the remaining copies.

A RAID array may also be configured such that, while two copies of each file are being written to storage devices, more total devices are available for use, therefore simultaneously enabling higher throughput and automated replication. A typical storage device (e.g., network attached storage ("NAS"), storage area network ("SAN")) may include numerous storage devices such as HDDs and SSDs that may be arranged in a RAID array to prevent against the failure of any one device. For example, a NAS device with three HDDs arranged in a RAID array may store two logical copies of the same data on the three combined disks so that failure of any one HDD can be recovered from by replacing that HDD and recreating the data on it from the other two devices. A common RAID implementation for a storage node may be what is known as RAID 5 or RAID 6, where an "exclusive or" calculation is used to back up each bit stored to an array. In a RAID 5 example. with the algorithm, a parity bit may be stored on one drive in the array calculated from each bit in the same position on the other drives of the array. This is made possible due to the binary nature of data storage, where every bit is either a 0 or a 1. In a simplified example for visualization purposes, device 1 may store a 1, and device 2 may store a 0. In the example, because the data in device 1 and device 2 is different, a 1 is stored on device 3. Therefore if device 2 fails, you can calculate that since you know that device 1 had different data from device 2 due to the 1 stored on device 3, device 2 must have had a 0. Therefore the data on disc 2 can be recreated if disc 2 fails and requires replacement. Since the order of the devices is known, one device can always store the result of a chain of "exclusive or" operations and therefore only the effective capacity of one disc needs to be used to store a "backup" of every other corresponding bit on the other drives. A 3 device RAID 5 array therefore results in a 33% replication overhead, while a 5 device RAID 5 array only requires 1 of the 5 devices' capacity to be lost, resulting in 20% replication overhead. However, as arrays increase in size, a second parity bit may be advantageous to guard against the possibility of losing a second device to failure before the first failed device is reconstructed, at the cost of another device worth of overhead on the array (e.g., RAID 6).

In a typical system, a RAID configuration may be implemented in any of multiple layers of the storage stack, including as both software and hardware implementations. RAID algorithms and replication may be performed by a dedicated hardware RAID array, either attached to or external to a computer server. The RAID algorithms may also be implemented in host bus adapter firmware, either for direct attached storage via, for example, peripheral component interconnect ("PCI") connections, or for NAS or SAN storage via, for example, network cards and/or fiber channel cards. In some examples, RAID may also be implemented by software at the kernel level via a kernel device driver, or even at an application level. RAID implementations may also leverage a combination of these various software and hardware interposition points where storage data may be diverted. RAID implementations may typically be used to deliver improved redundancy and/or throughput to storage devices, and persistent memory devices exhibit many of the same behavioral and functional characteristics as more typical storage devices.

Persistent memory is a relatively new technology that may sometimes be considered a third tier of storage, between traditional memory devices and storage devices in performance, with some functional similarities to both. In typical examples, persistent memory attempts to combine the advantages of traditional memory devices (e.g., fast, low-latency, direct access by CPUs) with the advantages of storage devices (e.g., data persists after power down). Storage devices where data remains stored in the absence of power are typically known as "non-volatile" storage devices. Persistent memory may be implemented in a variety of ways, a rudimentary example being a traditional memory device (e.g., DRAM) wired to a non-volatile EEPROM device (e.g., flash memory) with an additional temporary power source. In such an example, the persistent memory device may be accessed by the CPU via the traditional memory device's interface, but may be configured to, for example, utilize the temporary power source (e.g., a battery or a capacitor) to store the contents of the traditional memory device to the EEPROM device (e.g., flash memory) when a power failure of main power is detected. Persistent memory implementations may be known as Non-Volatile Dual In-line Memory Modules ("NVDIMMs").

An NVDIMM may be configured to copy data to its non-volatile component (e.g., EEPROM, flash memory) without the computer system being aware of such backup procedures. Such NVDIMMs may be implemented with attached flash storage or onboard flash storage, and may additionally access block-oriented flash memory as a memory cache. Alternative forms of persistent memory may also be implemented, for example, traditional DRAM backed up by battery power may be persistent for the duration of the battery's charge, with the battery being charged while the system is powered on. In an example, persistent memory may be implemented with any form of suitable non-volatile memory, including flash memory, nano random access memory ("NRAM"), nanocrystal wire-based memory, silicon-oxide based sub-10 nanometer process memory, graphene memory, Silicon-Oxide-Nitride-Oxide-Silicon ("SONOS"), resistive random-access memory ("RRAM"), programmable metallization cell ("PMC"), conductive-bridging RAM ("CBRAM"), magneto-resistive RAM ("MRAM"), spin-transfer torque RAM ("STT-RAM"), dynamic RAM ("DRAM"), phase change RAM ("PCM" or "PRAM"), or other non-volatile solid-state storage media, also known as solid state drives ("SSDs"). In other examples, nonvolatile memory associated with persistent memory may be implemented with magnetic media, optical media, or other types of non-volatile storage media, for example a hard disk drive or an optical storage drive.

The advent of persistent memory introduces significant potential changes to storage architecture. In many examples, persistent memory may be implemented to provide non-volatile storage that bypasses the host bus adapters used to access traditional storage devices, resulting in bypassing a commonly used interposition point for RAID replication of long term data storage (for example, in RAID 1 implementations). Since persistent memory is often implemented to connect to a computer system via a DRAM interface, the whole storage stack in a traditional kernel may be bypassed. The persistent memory may then be directly mapped into an application's address space, with loads and stores to and from persistent memory bypassing the kernel's involvement completely after page faults are resolved. This form of direct mapping to persistent memory is known as direct access ("DAX") and allows for byte-level access to non-volatile media plugged into the memory bus of the computer system.

DAX may allow for significant throughput advantages as compared to traditional block based storage access, offering very large performance improvements for a variety of time sensitive operations, for example, web search. For example, accessing a high performance solid state drive through a block based interface may take two orders of magnitude more time than DAX access to persistent memory. A cost of implementing DAX, however, is that many typical replication solutions (e.g., legacy RAID implementations) no longer work because the data being stored never hits the storage stack and/or RAID driver. RAID implementations may alternatively be implemented at the application level on a per application basis, being triggered by the application itself, perhaps through the use of a shared library in some cases, but such implementations lack the uniformity and assurance of robust, redundant storage provided by system wide mirroring implementations.

As described herein, for systems that make use of persistent memory, traditional redundancy methods may be less effective. DAX operations may be performed via simple cache flushing and fencing operations that are provided by the CPU, so there is no transition from user space into kernel space. In such a case, read or write system calls are not performed, and likewise calls to memory-sync (msync) functionality may not be performed. This means that in some embodiments, the kernel does not receive an indication of when data becomes dirty or clean.

In effect, traditional interposition drivers, such as software Redundant Array of Independent Disks (RAID) drivers, may be incapable of providing services to DAX-based applications. As such, applications or libraries may be utilized to re-implement features such as redundancy, encryption and thin provisioning, in user space.

The present disclosure aims to address the loss of interposition points for RAID drivers by implementing kernel software RAID support for DAX file systems through the implementation of a new interposition point in a portable, software based mirroring system that may be retrofit into existing systems transitioning to persistent memory based storage. In a typical example, once a DAX mapping is established, an application may store data without the involvement of the operating system, by using CPU store instructions. Because stores to main memory (and hence persistent memory) are typically cached by the CPU, applications may optimally take steps to ensure that stored data is durable or persistent (e.g. the data survives power failure). This is typically accomplished by issuing a sequence of CPU instructions which may vary depending on CPU architecture. Common steps in achieving storage durability or persistence may include a "flush" operation where the contents of CPU caches are sent to memory, followed by a "fence" operation committing the "flushed" data to memory. Many file systems also require making any metadata affected by the "flush" and/or the "fence" operation durable, for example, through a memory sync call (e.g., msync). Alternatively, no msync call may be made, as described herein. In systems requiring the commitment of metadata, without making a call to msync, context switching into the kernel for communication functionality with a requesting user provides an interposition point that may be leveraged by a software RAID driver in DAX programming models. Advantageously, the performance advantages of DAX programming and persistent memory may be realized while retaining the data security offered by mirrored storage in a RAID-like implementation, without any disk based storage.

Figure 1A:
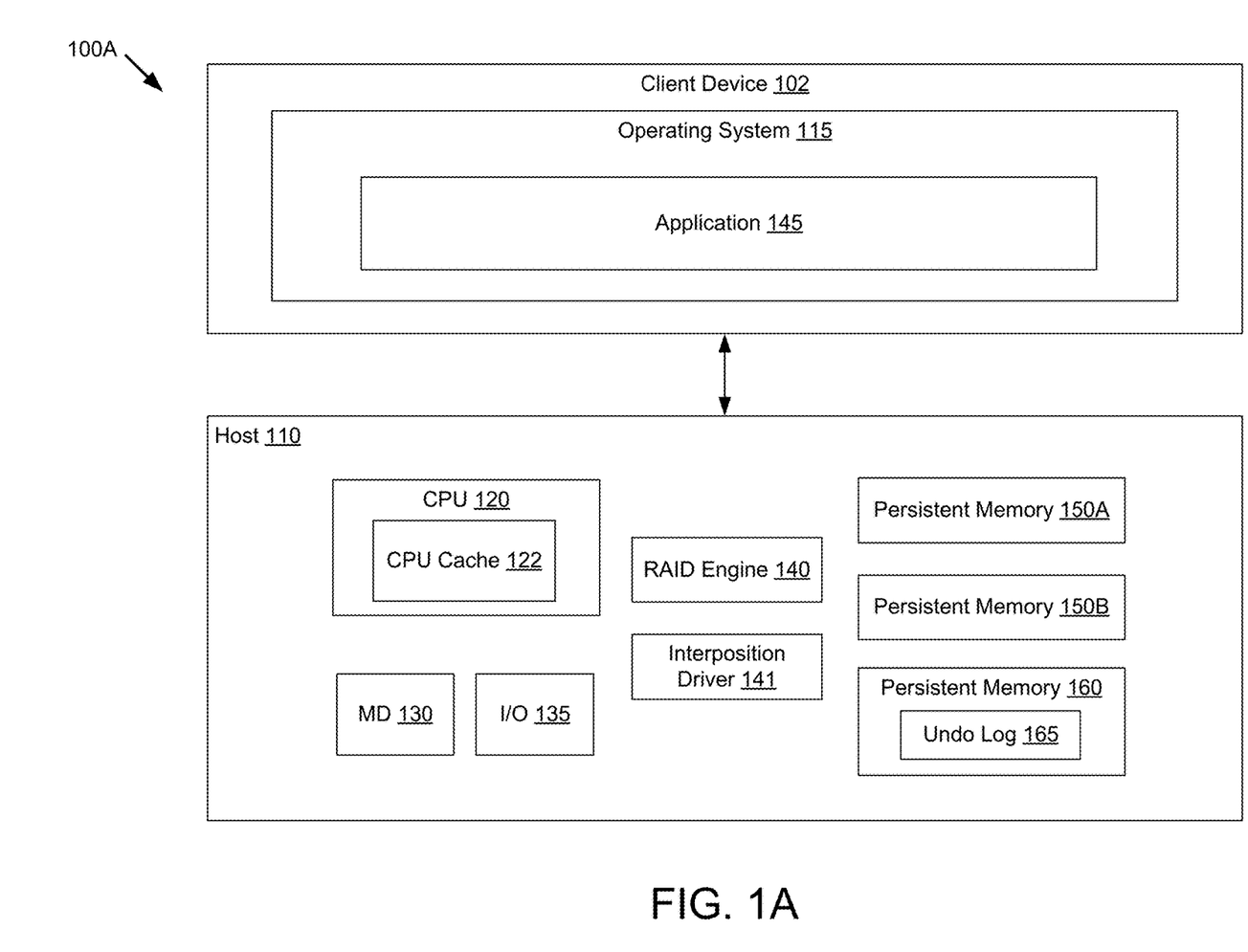
FIG. 1A is a first block diagram of a kernel software RAID support for DAX filesystem according to an example of the present disclosure.

FIG. 1 is a block diagram of a kernel software RAID support for DAX filesystem 100A according to an example of the present disclosure. The system 100 may include one or more hosts (e.g., host 110). Host 110 may be a physical host or a virtual host, similarly, operating system 115 (e.g., Red Hat Enterprise Linux®) may be either a host operating system or a guest operating system. Host 110 may in turn include one or more physical processors (e.g., CPU 120) communicatively coupled to memory devices (e.g., MD 130), input/output devices (e.g., I/O 135), and persistent memory devices (e.g., persistent memories 150A-B and 160). In an example, another persistent memory device may be substituted for memory device 130. As used herein, physical processor or processors 120 refer to devices capable of executing instructions encoding arithmetic, logical, and/or I/O operations. In one illustrative example, a processor may follow a Von Neumann architectural model and may include an arithmetic logic unit (ALU), a control unit, and a plurality of registers. In an example, a processor may be a single core processor which is typically capable of executing one instruction at a time (or processing a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU"). In an example, CPU 120 may be associated with one or more CPU caches (e.g., CPU cache 122). In the example, CPU cache 122 may be high speed memory closely located to CPU 120, where data for imminent processing by CPU 120 may be loaded to enhance processing times. In an example, data for a future instruction to be processed by CPU 120 may be pre-loaded in CPU cache 122, and processing results from CPU 120 may be stored in CPU cache 122 until such data is transferred from or "flushed" from CPU cache 122 to memory device 130 and/or persistent memory 150A.

As described herein, a memory device 130 refers to a volatile or non-volatile memory device, such as RAM, ROM, EEPROM, or any other device capable of storing data. As described herein, I/O device 135 refer to devices capable of providing an interface between one or more processor pins and an external device, the operation of which is based on the processor inputting and/or outputting binary data. CPU 120 may be interconnected using a variety of techniques, ranging from a point-to-point processor interconnect, to a system area network, such as an Ethernet-based network. Local connections within each physical host 110, including the connections between a processor 120 and a memory device 130 and between a processor 120 and an I/O device 135 may be provided by one or more local buses of suitable architecture, for example, peripheral component interconnect ("PCI"). In an example, persistent memories 150A-B and 160 may be implemented with any suitable hardware, including but not limited to any combination of flash memory, nano random access memory ("NRAM"), nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), magneto-resistive RAM ("MRAM"), spin-transfer torque RAM ("STT-RAM"), dynamic RAM ("DRAM"), phase change RAM ("PCM" or "PRAM"), other non-volatile solid-state storage media, magnetic media, optical media, hard disk drive or optical storage drive. Persistent memories 150A-B and 160 may be connected to processor 120 through any suitable interface including memory bus.

In one embodiment, host 110 may be a physical host or a virtual host implemented using any suitable form of virtualization (e.g., a virtual machine ("VM") or a container). A virtual host 110 may execute directly on a physical host or with a hypervisor and/or host operating system between the physical host and the virtual host 110. In an example, operating system 115 of client device 102 may support metadata updates and commitments in relation to data being written to persistent memory 150A. In an example, undo log 165 may be any form of suitable storage for a backup of the various storage subunits in persistent memories 150A-B (e.g., pages, blocks).

In an example, RAID engine 140 may be implemented via any form of executable code (e.g., executable file, script, application, service, daemon). In an example, RAID engine 140 orchestrates the redundancy of data between persistent memories 150A-B in conjunction with undo log 165, which stores one or more backup states of persistent memories 150A-B, and Interposition Driver 141, which may be a RAID driver, for example. In an example, RAID engine 140 may make data durable (e.g., calculate and store a RAID parity block) before the host 110 communicates that that the data has been successfully written. In one embodiment, host 110 memory maps a file to be written at the request of application 145. Advantageously, RAID engine 140 further ensures that all RAID algorithms happen before any communication (e.g., write confirmation) back to the client device 102 happens.

In one embodiment, data may be written to the DAX persistent-memory system 100A without accessing the kernel space. To write a RAID parity block to make the data redundant, however, the kernel may need to be accessed. Advantageously, system 100A takes advantage of the context switch into the kernel, for external communications (e.g., sending write confirmation to the client 102, to write the parity bit and confirm the data write to client device 102. A hook into the entry point to the kernel may provide instructions to implement RAID algorithms (e.g., calculate and store a parity block) before sending write confirmation to the client 110.

In various embodiments, RAID engine 140 and/or Interposition driver 141 may be implemented with any suitable hardware circuitry performing the tasks performed by a software implementation of the engines and/or drivers. In an example, application 145 may be any form of executable code (e.g., executable file, script, application, service, daemon) that stores data to persistent memory 150A.

Figure 1B:
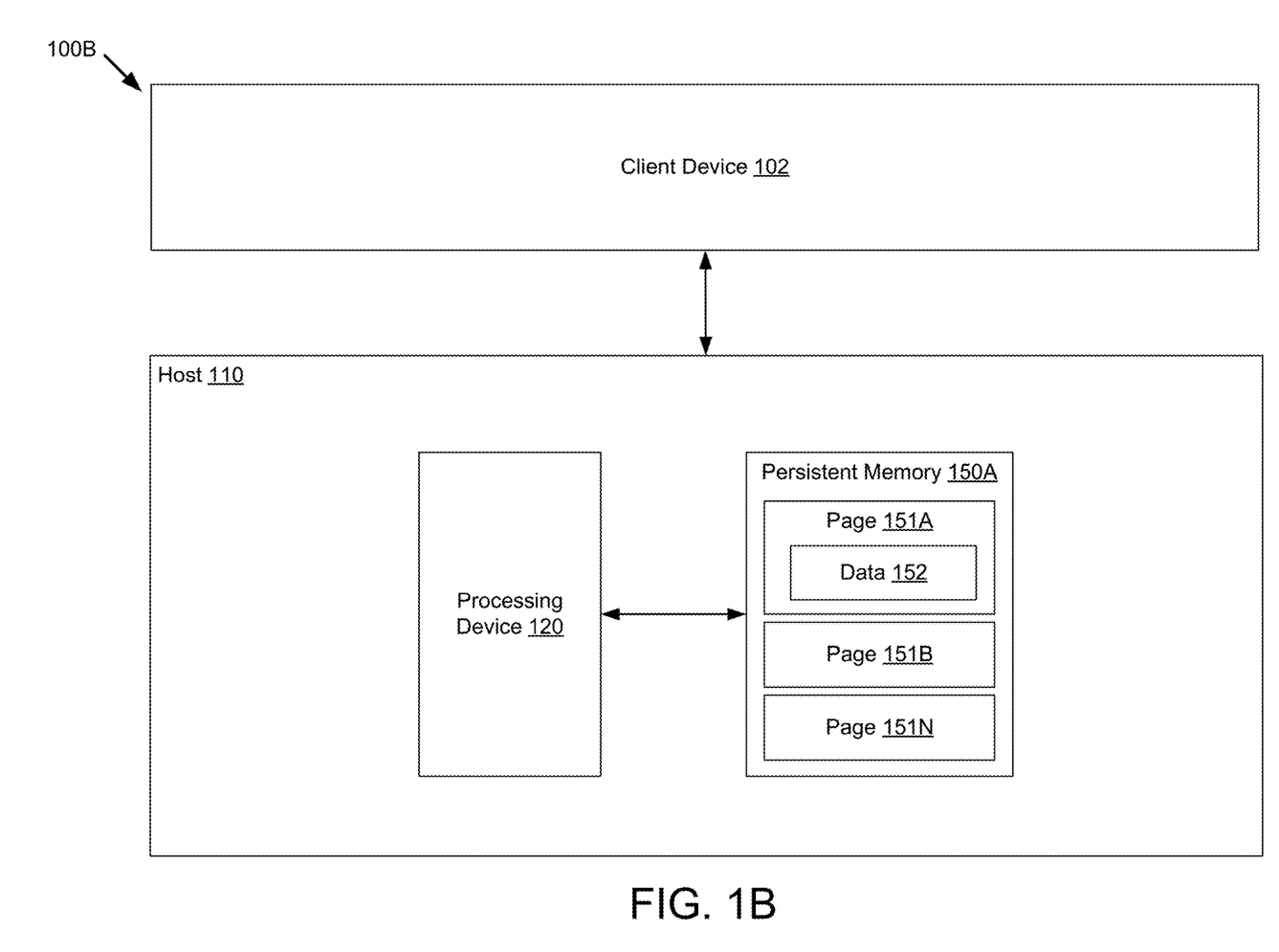
FIG. 1B is a second block diagram of a kernel software RAID support for DAX filesystem according to an example of the present disclosure.

FIG. 1B is a second block diagram of a kernel software RAID support for DAX filesystem 100B according to an example of the present disclosure. In one embodiment, system 100B includes a first persistent memory 150A to store data 152. System 100B may further include a processing device 120 of the storage system 100B, operatively coupled to the persistent memory 150A. In one embodiment, the processing device 120 is to perform one or more operations, as described herein.

Optionally, processing device 120 may receive a request to write the data 152 from the client device and generate a write fault in response to attempting to write the data. In one embodiment, processing device 120 is to detect the write fault associated with a first page 151A of a first plurality of pages (e.g., pages 151A, 151B, 151N, etc.) of the first persistent memory 150A. To detect the write fault associated with the first page 151A the processing device 120 may determine that the first page 151A was memory mapped and is read-only.

Processing device 120 may resolve the write fault and write, in response to resolving the write fault, data 152 to the first page 151A. In one embodiment, to resolve the write fault the processing device may further generate, in response to detecting the write fault, an undo log corresponding to current data of the first page and store the undo log in a second persistent memory. The undo log may optionally be further copied to a third persistent memory, for the sake of redundancy and error recovery.

Processing device 120 may further context switch into a kernel associated with the persistent memory 150A to provide a write confirmation to a client device 102 requesting the data be written. Processing device 120 may further update, in response to the context switching, a parity block associated with the first page 151A and provide, in response to updating the parity block, the write confirmation to the client device 102.

In one embodiment, if a redundant array of independent disk (RAID) leg storing the first page fails or suffers a power failure after writing the data 152 and before writing the parity block, and on recovery from failing, the processing device 120 may further restore the current data (e.g., data that existed before it was supposed to be replaced by new data) from the undo log and provide an indication to the client device that the data (e.g., the new data) was not written. In another embodiment, if an application or operating system of the client device 102 fails after writing the data 152 and before writing the parity block, and on recovery from failing, the processing device 120 may further provide control to the kernel and update the parity block. Additional description is provided with respect to FIGS. 2-5.

Figure 2:
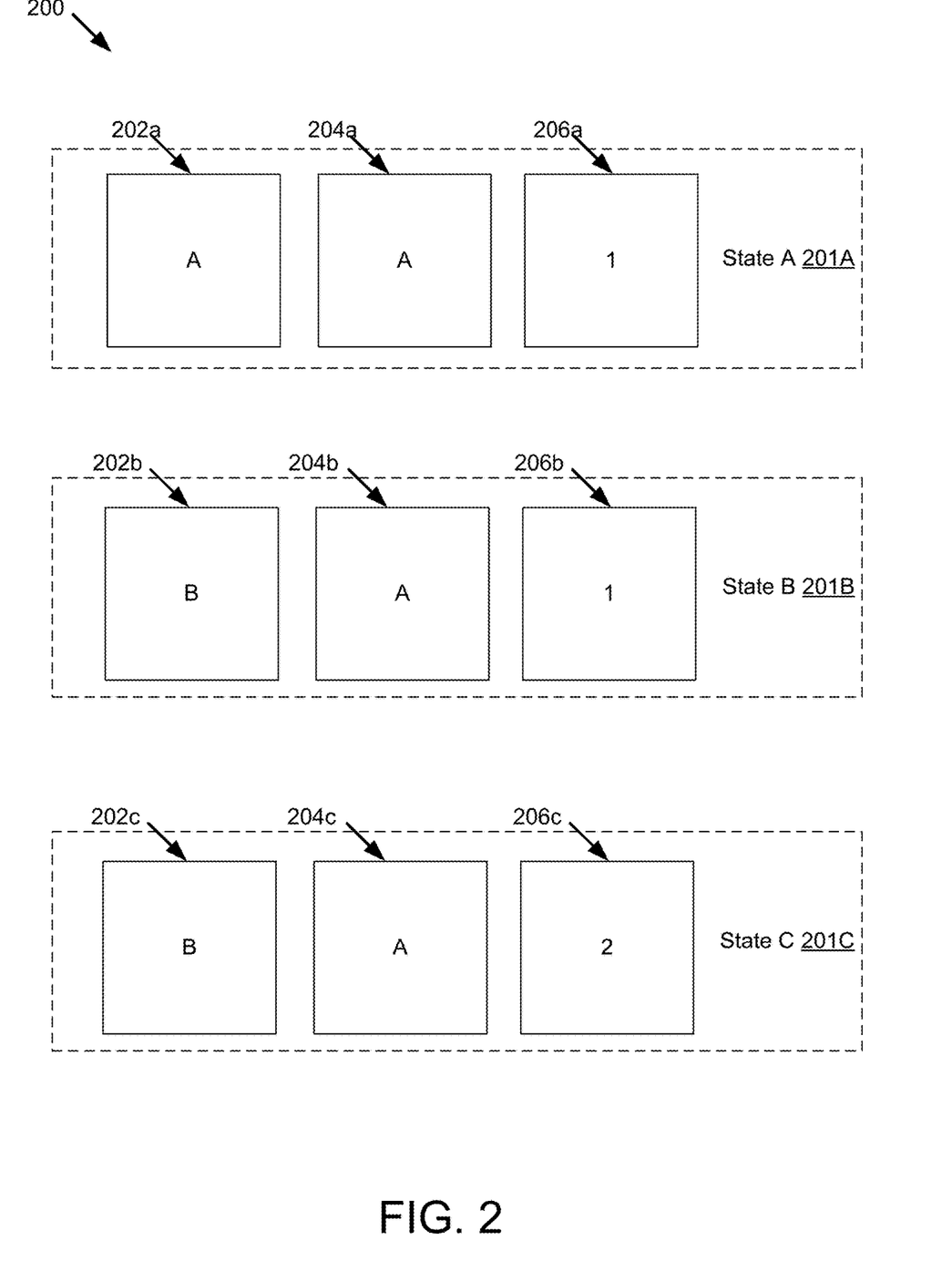
FIG. 2 is a block diagram of a sequence 200 of RAID states 201A, 201B, 201C according to an example of the present disclosure.

FIG. 2 is a block diagram of a sequence 200 of RAID states 201A, 201B, 201C according to an example of the present disclosure. In one embodiment, Applications do not exist in a vacuum. Data is stored on behalf of some requestor. That requestor can be a user interacting with the computer via keyboard or mouse, and receiving confirmation of data durability operations via a monitor, for example. In another embodiment, the requestor could be a user interacting with the program via a web page or thick client served over a network interface. In any of these examples, and others, hardware devices are involved in communicating the state of the operation to the requestor (e.g., write confirmations). In one embodiment, communicating via hardware devices utilizes context switches into the kernel in order to perform read or write operations, for example. This context switch into the kernel can be leveraged by interposition drivers (e.g., 140 of FIG. 1) to create a consistent view of storage at any given point in time, as described herein.

Consider a simplified software RAID 5 implementation with two data disks (e.g., legs) and a single dedicated parity disk. Consider also an application that makes changes to data via CPU store and fence instructions on behalf of a client device. The initial state of the RAID could be expressed as State A 201A of FIG. 2 including legs 202a and 204a, and parity block 206a. In this example, it is assumed that the application memory maps a file on this device. It is also assumed that a request is made for the application to store data. Because the memory is initially mapped read-only, a store by the application will trigger a write fault. The kernel may then create an undo log (e.g., a backup) using the current contents of the RAID member devices. This undo log may optionally be mirrored to provide fault tolerance.

When the undo log record is stored, the fault is resolved and the application regains control. The application may then make the requested change to the data (e.g., see block 202b) resulting in state B 201B.

Worth noting, because the application does not call into the kernel, the parity block 206b is not updated. Advantageously, when the application wishes to signal to the end user that the operation is complete, it context switches into the kernel (e.g., as a result of a send a message, writing to a video device, etc.). Upon context switching into the kernel, the parity block 206b may be updated as shown in 206c of state C 201C.

After the parity block has been updated, the system call is allowed to run and the result of the operation is conveyed to the user (e.g., client device). Continuing with this example, it is contemplated that a variety of failures may occur. Failures may occur from failure of a RAID leg (e.g., NVDIMM device), program crash, loss of power, etc.

In one embodiment, for a RAID leg failure between state B 201B and state C 201C, an inconsistent state exists. The parity 206b was not updated to match the new data 202b and the system is thus unable to reconstruct either the data 202b or the parity 206b from the surviving legs. Advantageously, since an undo log of the state was saved the system can revert the RAID to the initial state (e.g., 201A), and send a signal to the application without performing the system call logic that communicates state externally. Note that a failure of an NVDIMM may result in a machine check exception. This will likely be caught when the parity is calculated, and thus can be handled by the RAID implementation.

In one embodiment, for a program crash, control may be returned to the kernel, and the parity blocks will be updated (e.g., 206b to 206c) resulting in a consistent state 201C from the application's point of view. In one embodiment, for a power failure, there are two case to consider. First, if the power failure occurred before the parity block was updated, it means that no state information was communicated externally. The undo log can be used to restore the original data, and the application is reverted back to a consistent state 201A. If the party had been updated (e.g., 206c), the application's transaction is complete, and the client may or may not have received indication of the completion. The client may be responsible, in this case, to confirm the state.

In some embodiment, communication regarding the state of data on disk is done via shared application state, such as shared memory. In such a case, state information may be communicated externally without a context switch into the kernel. For these use cases, providing in-kernel raid will require simple program modification. A simple call to getuid, for example, may be sufficient.

Figure 3:
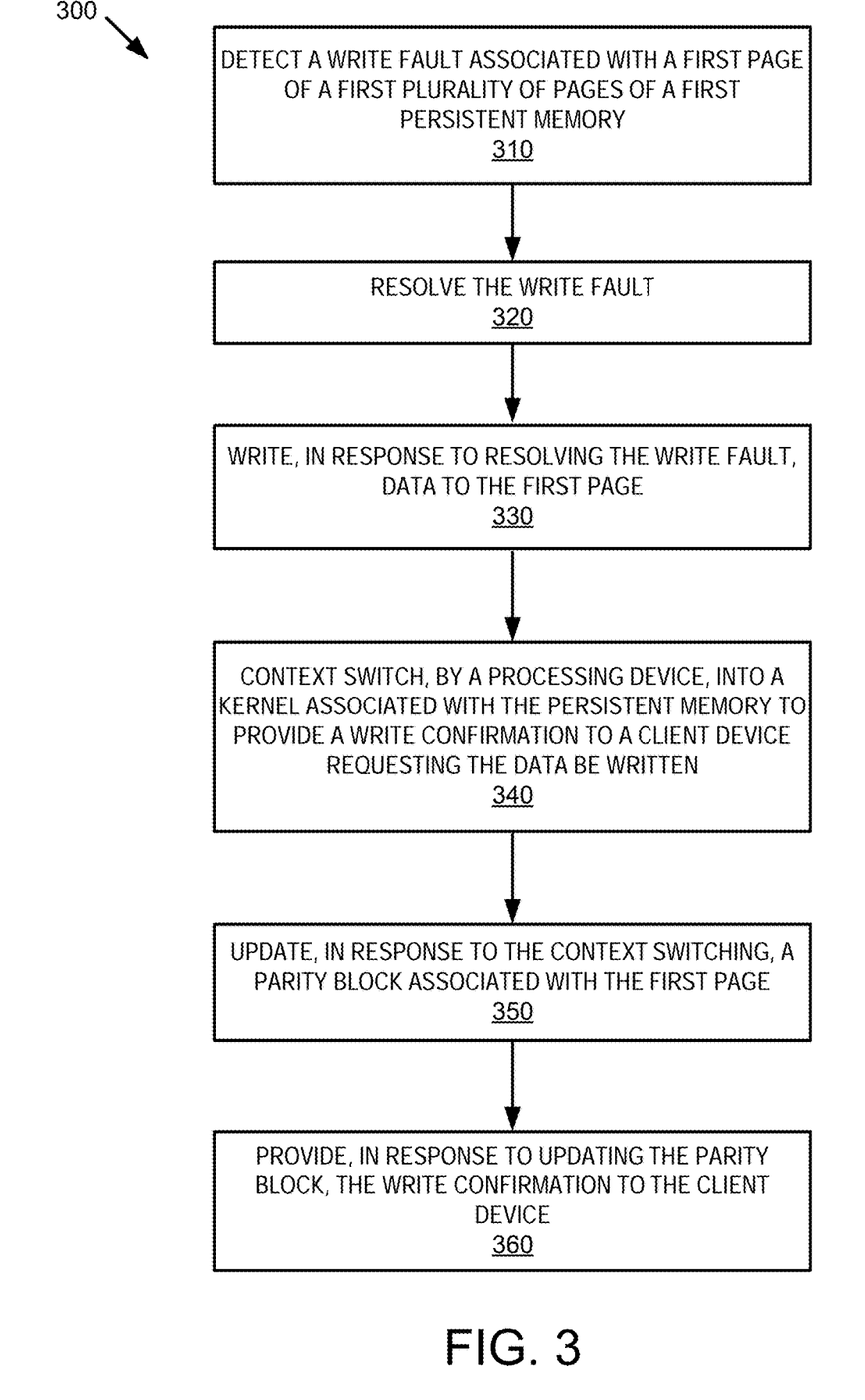
FIG. 3 is a first flow diagram of a method of kernel software RAID support for DAX filesystem, in accordance with some embodiments of the present disclosure.

FIG. 3 is a first flow diagram of a method of kernel software RAID support for DAX filesystem, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by RAID engine 140 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring to FIG. 3, before block 310, processing logic optionally receives a request to write data from a client device and generate a write fault in response to attempting to write the data. In one embodiment, processing logic detects the write fault associated with the first page of a first plurality of pages of a first persistent memory at block 310. To detect the write fault associated with the first page, processing logic may determine that the first page was memory mapped and is read-only.

At block 320, processing logic may resolve the write fault and write (block 330), in response to resolving the write fault, data to the first page. In one embodiment, to resolve the write fault the processing logic may further generate, in response to detecting the write fault, an undo log corresponding to current data of the first page and store the undo log in a second persistent memory (or in the first persistent memory, or in any over storage location). The undo log may optionally be further copied to a third persistent memory (e.g., or other storage location), for the sake of redundancy and error recovery.

Processing logic at block 340 may further context switch into a kernel associated with the persistent memory to provide a write confirmation to a client device requesting the data be written. At block 350, processing logic may further update, in response to the context switching, a parity block associated with the first page and provide (block 360), in response to updating the parity block, the write confirmation to the client device.

Figure 4:
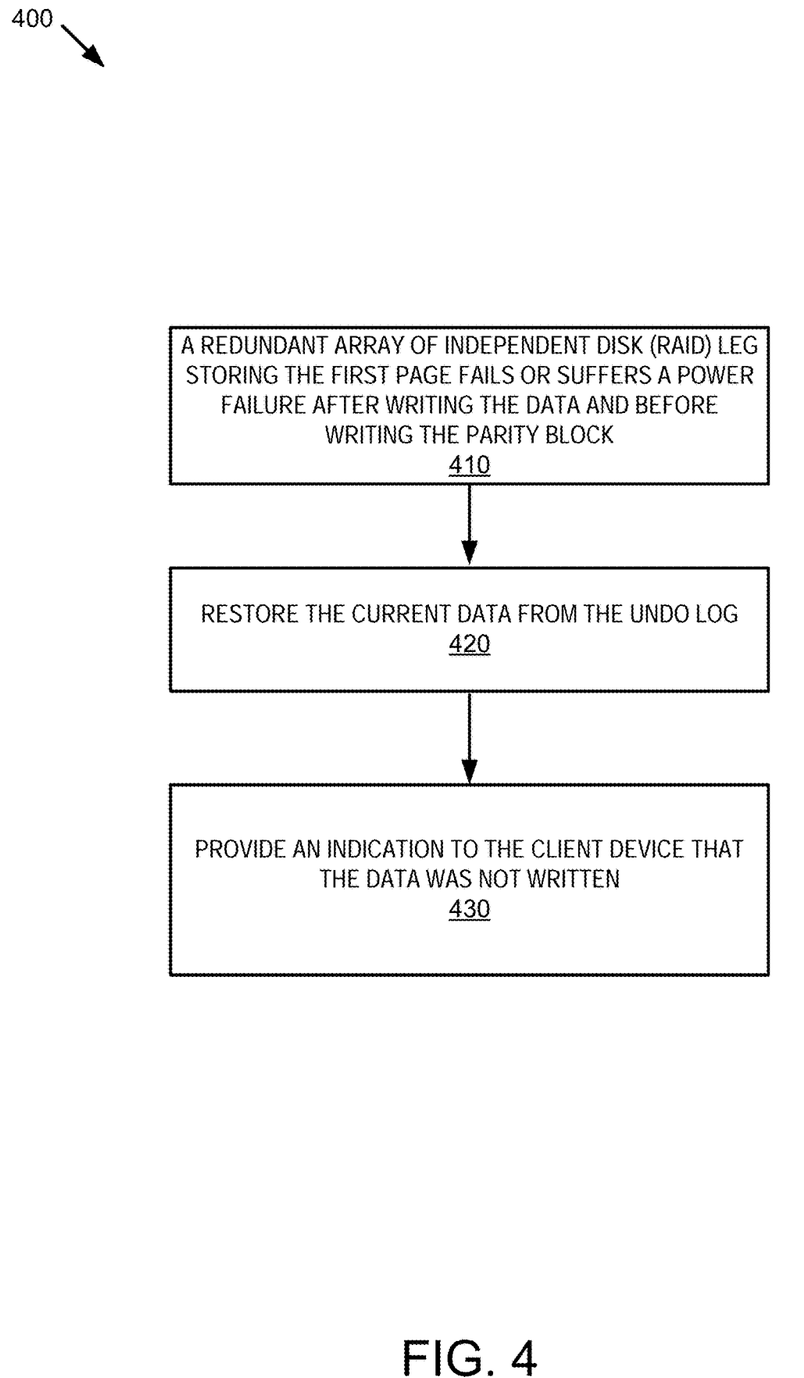
FIG. 4 is a second flow diagram of a method of kernel software RAID support for DAX filesystem, in accordance with some embodiments of the present disclosure.

FIG. 4 is a second flow diagram of a method of kernel software RAID support for DAX filesystem, in accordance with some embodiments of the present disclosure.

The method 400 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 400 may be performed by RAID engine 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring to FIG. 4, at block 410, a redundant array of independent disk (RAID) leg storing the first page fails or suffers a power failure after writing the data and before writing the parity block. At block 420, on recovery from failing, processing logic may restore the current data (e.g., data that existed before it was supposed to be replaced by new data) from the undo log. At block 430, processing logic may further provide an indication to the client device that the data (e.g., the new data) was not written. In another embodiment, if an application or operating system of the client device fails after writing the data and before writing the parity block, on recovery from failing, the processing logic may provide control to the kernel and update the parity block.

Figure 5:
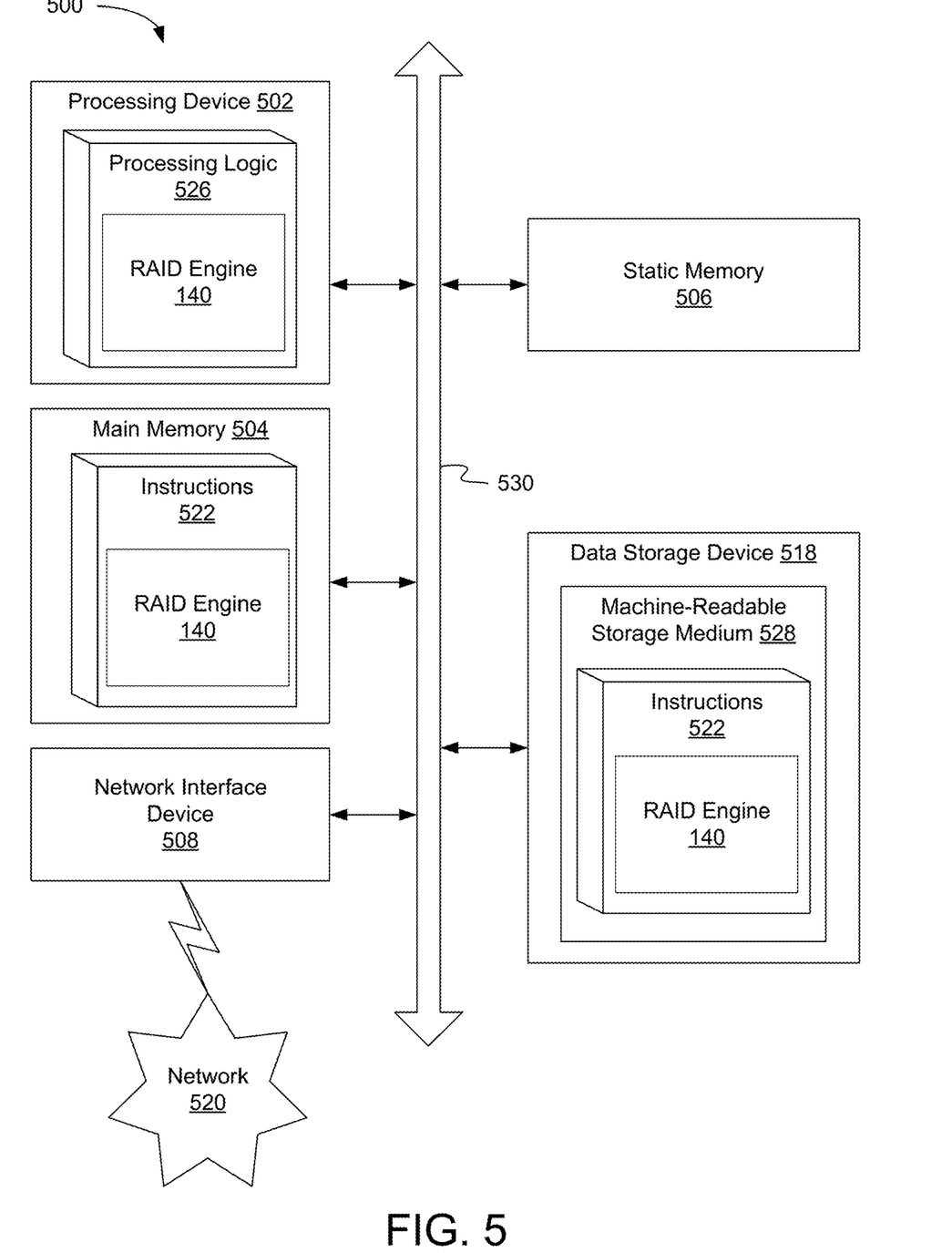
FIG. 5 is a block diagram of an example apparatus that may perform one or more of the operations described herein, in accordance with some embodiments.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as cloud servers 110a, b configured to perform data storage and migration.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of RAID Engine 140 of FIG. 1, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute RAID Engine 140. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for multi-level task debugging, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM), magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third,"

"fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
   detecting a write fault associated with a first page of a first plurality of pages of a first persistent memory;
   resolving the write fault;
   writing, in response to resolving the write fault, data to the first page;
   context switching, by a processing device, into a kernel associated with the persistent memory to provide a write confirmation to a client device requesting the data be written;
   updating, in response to the context switching, a parity block associated with the first page; and
   providing, in response to updating the parity block, the write confirmation to the client device.

2. The method of claim 1, wherein resolving the write fault comprises:
   generating, in response to detecting the write fault, an undo log corresponding to current data of the first page; and
   storing the undo log in a second persistent memory.

3. The method of claim 2, further comprising copying the undo log to a third persistent memory.

4. The method of claim 2, wherein a redundant array of independent disk (RAID) leg storing the first page fails or suffers a power failure after writing the data and before writing the parity block, and on recovery from failing, the method further comprising:
   restoring the current data from the undo log; and
   providing an indication to the client device that the data was not written.

5. The method of claim 1, wherein an application or operating system of the client fails after writing the data and before writing the parity block, and on recovery from failing, the method further comprising:
   providing control to the kernel; and
   updating the parity block.

6. The method of claim 1, further comprising:
   receiving a request to write the data from the client device; and
   generating the write fault in response to attempting to write the data.

7. The method of claim 1, wherein detecting the write fault associated with the first page comprises determining that the first page was memory mapped and is read-only.

8. A system, comprising:
   a first persistent memory to store data; and
   a processing device of a storage system, operatively coupled to the memory, the processing device to:
      detect a write fault associated with a first page of a first plurality of pages of the first persistent memory;
      resolve the write fault;
      write, in response to resolving the write fault, data to the first page;
      context switch into a kernel associated with the persistent memory to provide a write confirmation to a client device requesting the data be written;
      update, in response to the context switching, a parity block associated with the first page; and
      provide, in response to updating the parity block, the write confirmation to the client device.

9. The system of claim 8, wherein to resolve the write fault the processing device is to:
   generate, in response to detecting the write fault, an undo log corresponding to current data of the first page; and
   store the undo log in a second persistent memory.

10. The system of claim 9, the processing device further to copy the undo log to a third persistent memory.

11. The system of claim 9, wherein a redundant array of independent disk (RAID) leg storing the first page fails or suffers a power failure after writing the data and before writing the parity block, and on recovery from failing, the processing device is to:
    restore the current data from the undo log; and
    provide an indication to the client device that the data was not written.

12. The system of claim 8, wherein an application or operating system of the client fails after writing the data and before writing the parity block, and on recovery from failing, the processing device is to:
    provide control to the kernel; and
    update the parity block.

13. The system of claim 8, the processing device further to:
    receive a request to write the data from the client device; and
    generate the write fault in response to attempting to write the data.

14. The system of claim 8, wherein to detect the write fault associated with the first page the processing device is to determine that the first page was memory mapped and is read-only.

15. A non-transitory computer-readable storage medium including instructions that, when executed by a processing device of a storage system, cause the processing device to:
    detect a write fault associated with a first page of a first plurality of pages of a first persistent memory;
    resolve the write fault;
    write, in response to resolving the write fault, data to the first page;
    context switch, by the processing device, into a kernel associated with the persistent memory to provide a write confirmation to a client device requesting the data be written;
    update, in response to the context switching, a parity block associated with the first page; and
    provide, in response to updating the parity block, the write confirmation to the client device.

16. The non-transitory computer-readable storage medium of claim 15, wherein to resolve the write fault the processing device is to:
    generate, in response to detecting the write fault, an undo log corresponding to current data of the first page; and
    store the undo log in a second persistent memory.

17. The non-transitory computer-readable storage medium of claim 16, wherein a redundant array of independent disk (RAID) leg storing the first page fails or suffers a power failure after writing the data and before writing the parity block, and on recovery from failing, the processing device is to:
    restore the current data from the undo log; and provide an indication to the client device that the data was not written.

18. The non-transitory computer-readable storage medium of claim 15, wherein an application or operating system of the client fails after writing the data and before writing the parity block, and on recovery from failing, the processing device is to:
provide control to the kernel; and
update the parity block.

19. The non-transitory computer-readable storage medium of claim 15, the processing device further to:
receive a request to write the data from the client device; and
generate the write fault in response to attempting to write the data.

20. The non-transitory computer-readable storage medium of claim 15, wherein to detect the write fault associated with the first page the processing device is to determine that the first page was memory mapped and is read-only.

* * * * *